June 22, 1937.    J. COTAL    2,084,522
CLUTCHING AND SPEED CHANGING GEAR
Filed Aug. 13, 1935    4 Sheets-Sheet 1
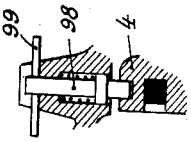
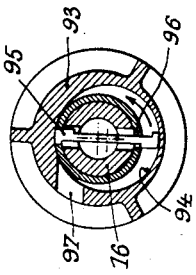
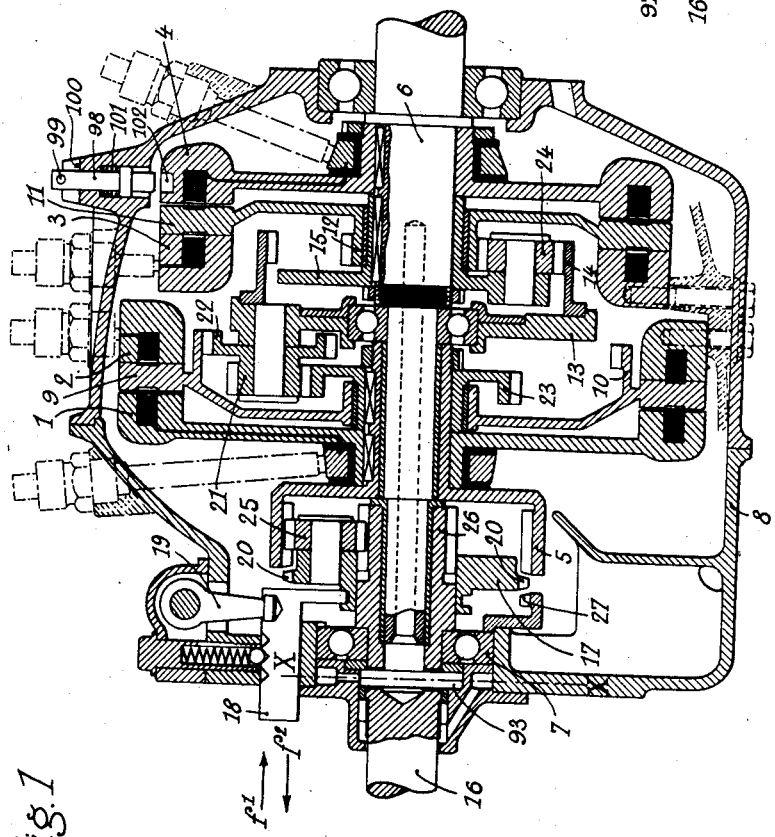
J. Cotal
Inventor
By Glascock Downing Seebold
Attys.

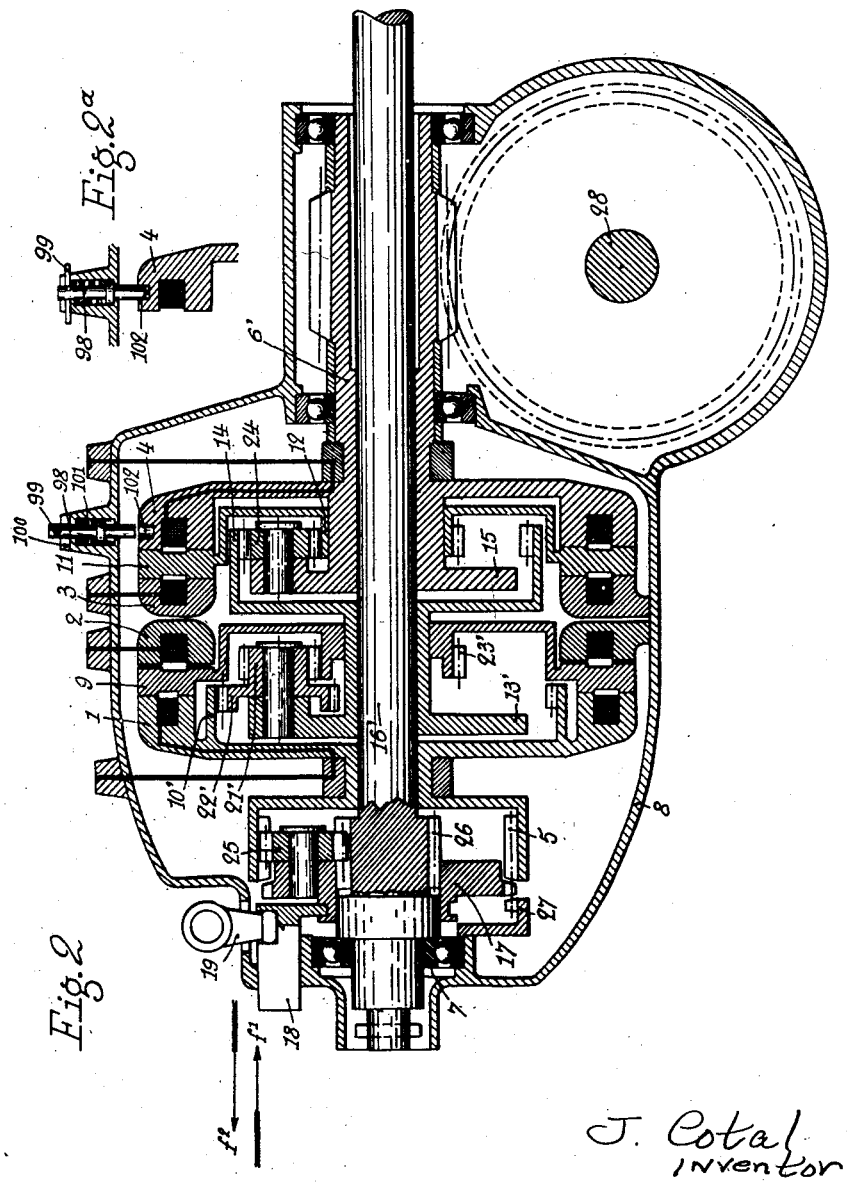

June 22, 1937.  J. COTAL  2,084,522
CLUTCHING AND SPEED CHANGING GEAR
Filed Aug. 13, 1935   4 Sheets-Sheet 3

J. Cotal
INVENTOR

By Glascock Downing & Seiboll
ATTYS.

June 22, 1937. J. COTAL 2,084,522
CLUTCHING AND SPEED CHANGING GEAR
Filed Aug. 13, 1935 4 Sheets-Sheet 4
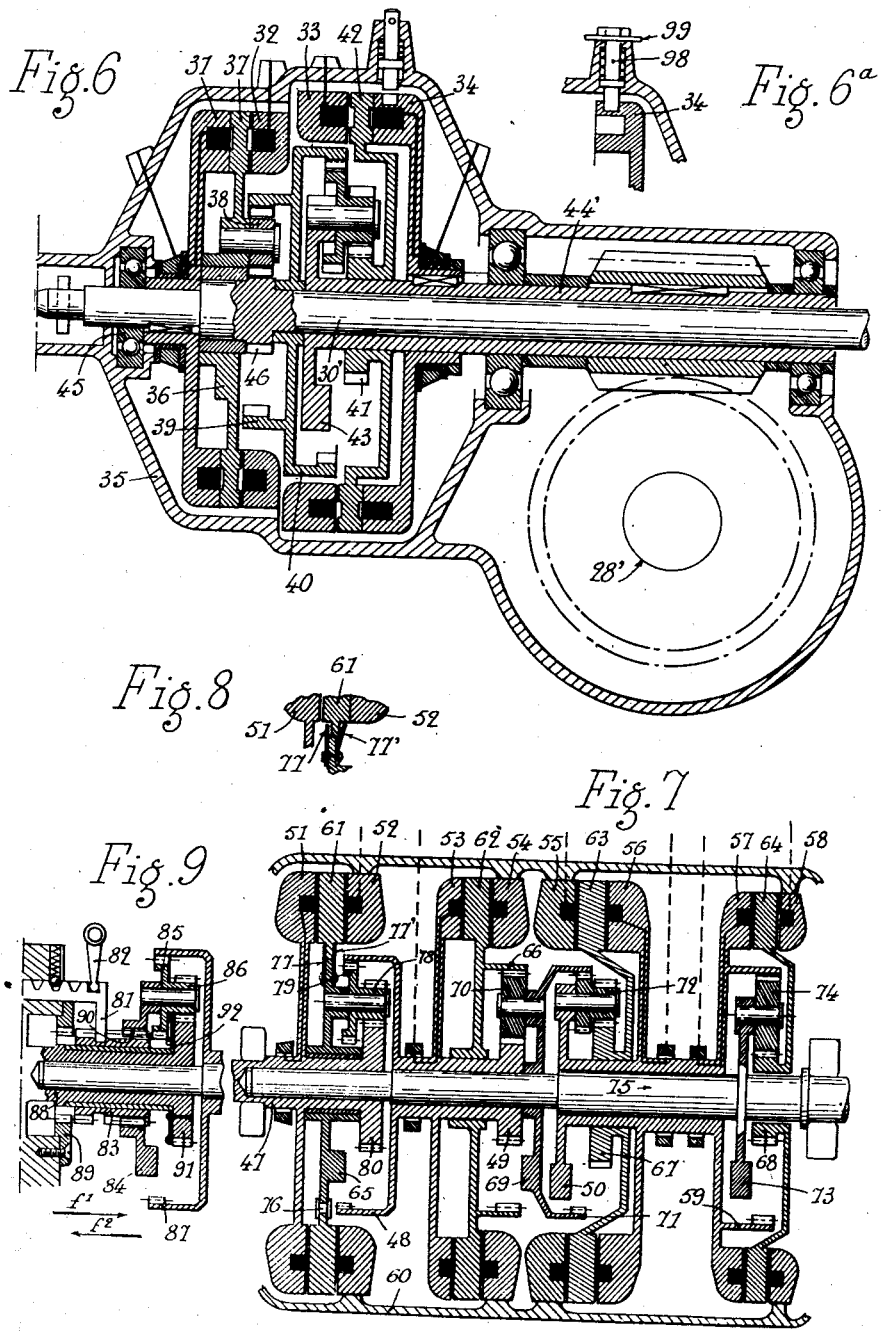
J. Cotal
INVENTOR
By Glascock Downing Seebold
Attys.

Patented June 22, 1937

2,084,522

UNITED STATES PATENT OFFICE 2,084,522

CLUTCHING AND SPEED-CHANGING GEAR

Jean Cotal, Paris, France

Application August 13, 1935, Serial No. 36,029
In Great Britain September 21, 1934

1 Claim. (Cl. 74—270)

The present invention relates to a clutching and speed-changing gear, of the type in which a speed-reversing device provided with planetary wheels is combined with one or more planetary sets forming speed-changing devices.

One of the objects of the invention is to mount the speed-reversing device in such manner that it will be subject to a minimum stress. For this purpose, according to the invention, the speed-reversing device is inserted between the driving shaft and the speed-changing device, in order that the said speed-reversing device shall only be obliged to support the power torque, whatever be the combination of speed utilized in the speed-changing device. Moreover, the speed-reversing device comprises, between the position for forward drive and the position for reverse drive, a neutral position in which all transmission of movement is eliminated between the driving shaft and the speed-changing device. Again, in order to prevent the axial displacement of the support of the planetary pinions, a toothed sleeve, participating in the rotation of said support, may move axially and thus engage either with the fixed casing or with the teeth of one of the wheels of the planetary set.

Another object of the invention is to construct the speed-reversing device in such way as to obtain equal speeds in both directions, this being advantageous for certain uses, such as railway motor vehicles, steam tractors, etc. This result is obtained, in conformity with the invention, by mounting stepped planetary pinions between the sun-wheels of the speed-reversing device.

By employing, in combination with the speed-reversing device, several planetary sets for speed increase or speed reduction, or both for speed increase and reduction, one may obtain any number of speeds, both forward and reverse.

According to another feature of the invention, the driven shaft of the speed-changing device directly controls propelling devices located between the source of power and the gear-case. This application may be advantageous in the case of certain vehicles having front driving wheels.

A securing device further permits of maintaining the stopping of the driven shaft, independently of all electric power, in order to ensure the stopping of said shaft in all cases.

Moreover, an oil pump is actuated by the driving shaft, in order to ensure, in all cases, the lubrication of the whole mechanism, even when the speed-reversing device is in the neutral position.

By means of the aforesaid arrangements, it is possible to obtain a clutching and speed-changing gear which is substantial, homogeneous, reliable in its working, noiseless, having a high efficiency, well lubricated, and adapted for a ready use upon all types of vehicles.

In the accompanying drawings are given, by way of example, several embodiments of the invention.

Fig. 1 represents, in longitudinal section, a gear-box adapted for four forward speeds with electric control and with reverse drive with mechanical control.

Fig. 1ᵃ is a partial section of the device which maintains stationary the driven shaft of Fig. 1, but in a position different from the one shown in Fig. 1.

Fig. 2 represents a modified form of the gear-box in Fig. 1, adapted to actuate, on direct drive, wheels or propelling means situated between the driving element and the speed-changing box.

Fig. 2ᵃ is a partial section of the device which maintains stationary the driven shaft of Fig. 2, but in a position different from the one shown in Fig. 2.

Figure 5:
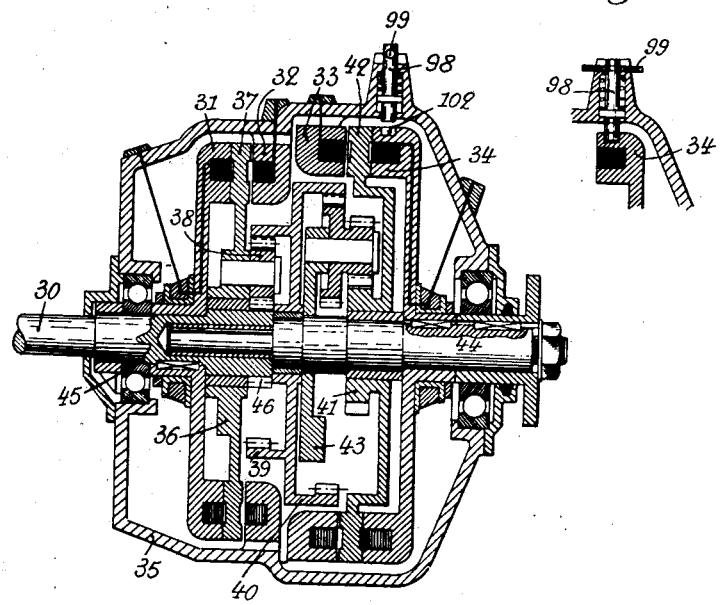
Fig. 5 represents a box adapted for two forward speeds and reverse drive, with electric control.
Figure 5A:
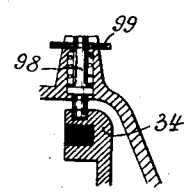

Fig. 5ᵃ is a partial section of the device which maintains stationary the driven shaft of Fig. 5, but in a position different from the one shown in Fig. 5.

Fig. 6 represents a modification of Fig. 5, also adapted to actuate the wheels or propelling means situated between the driving element and the gear-box.

Fig. 6ᵃ is a partial section of the device which maintains stationary the driven shaft of Fig. 6, but in a position different from the one shown in Fig. 6.

Fig. 7 represents a longitudinal section of a mechanism adapted for eight equal speeds on forward drive and on rear drive, the reversal of speed being effected by electric control, with an idle position.

Fig. 8 represents a detail of the mechanism shown in Fig. 7.

Fig. 9 shows a modification of speed reversal, when this latter is under mechanical control.

Fig. 10 is a section of the lubricating pump, on the line 10—10 of Fig. 1.

The apparatus represented in Fig. 1 consists of two planetary sets which are controlled by electromagnets 1, 2, 3, 4.

The rotatable electromagnet 1 is secured to a driving orbit gear 5.

The rotatable electromagnet 4 is secured to the driven shaft 6 which extends, at the central part, to the front bearing 7 of the gear box.

The fixed electromagnet 2 and the fixed electromagnet 3 are secured to the casing 8.

An armature 9, secured to the loose orbit gear 10 may be coupled either to the rotating electromagnet 1 or to the fixed electromagnet 2.

Another armature 11, secured to the sun-wheel 12, may be coupled either to the fixed electromagnet 3 or to the rotating electromagnet 4.

The planetary pinion carrier 13 of the first gear set is secured to the orbit gear 14 of the second gear set. Upon the said planetary pinion carrier 13 are rotatably mounted the planetary pinions 21 and 22 which have different diameters but are secured together, and they engage respectively the sun-wheel 23 secured to the orbit gear 5, and the orbit gear 10.

The planetary pinion carrier 15 of the second gear set is secured to the driven shaft 6, and it carries the planetary pinions 24 engaging the sun-wheel 12 and orbit gear 14.

The driving orbit gear 5 receives the movement of the driving shaft 16 through the intermediary of an auxiliary gear set situated at the front in the casing; the planetary pinion carrier 17 of this set can be displaced on its axis of rotation by means of the fork 18 of the lever 19. The arrow $f^1$ corresponds to the operation with forward drive. The arrow $f^2$ corresponds to the operation with reverse drive. The intermediate position represented in the drawings corresponds to the neutral position or idle position. The planetary pinion carrier 17 carries the planetary pinions 25 in engagement with the orbit gear 5 and also with the sun-wheel 26 secured to the driving shaft 16.

The fork 18 is pushed according to the arrow $f^1$ in such a way as to engage the teeth 20 of the planetary pinion 17 with the teeth of the orbit gear 5, in order to connect the said gear 5 with the driving shaft 16, and this affords the different speeds for forward drive, as follows:

*First speed.*—The electromagnets 2 and 3 are energized; the gears 10 and 12 are held stationary. This affords two successive speed reduction ratios, one for each gear set.

*Second speed.*—The electromagnets 2 and 4 are energized; the speed reduction ratio is afforded by the first gear set, and the second set is on direct drive.

*Third speed.*—The electromagnets 1 and 3 are energized; the first gear set is on direct drive, and the second set affords the speed reduction ratio.

*Fourth speed.*—The electromagnets 1 and 4 are energized; the two gear sets operate on direct drive.

Whether by the use of the stepped planetary pinions 21 and 22, as shown in the drawings, or by any other means (dimensions of the gear wheels, etc.), the reduction ratio of the first gear set employed for the second speed is greater than that of the second gear set employed for the third speed. This ensures a range of four speeds, properly stepped, of which the fourth represents the direct drive.

*Reverse drive.*—In order to obtain the reverse drive, the planetary pinion carrier 17 is pushed according to the arrow $f^2$ and its teeth 20 enter into the fixed toothed ring 27, in which it is thus held fast.

As the driving shaft 16 acts by its gear wheel 26 upon the planetary pinions 25 of the planetary pinion carrier 17, these planetary pinions, whose axes are in the fixed position, will push the orbit gear 5 in the contrary direction. This affords, for the wheel 5, a reverse motion at a reduced speed, which can, if necessary, be further reduced at will by the use of the magnetic devices 1, 2, 3 and 4, thus providing any one of the intermediate speeds.

Fig. 2, as above stated, represents a mechanism similar to the one shown in Fig. 1, but herein the small sun-wheel 23' is secured to the armature 9, the large orbit gear 10' being secured to the driving orbit gear 5; on the other hand, the driving shaft 16' traverses the whole apparatus, and may thus be actuated by the engine on the side next the projecting part of the driven shaft 6'. In this case, the driven shaft 6' may act directly through worm gear, pinions, or like means, upon the parts to be actuated, such as the shaft 28. In Fig. 2 the axis of the casing is perpendicular to the axis of rotation of the parts to be operated.

Figure 3:
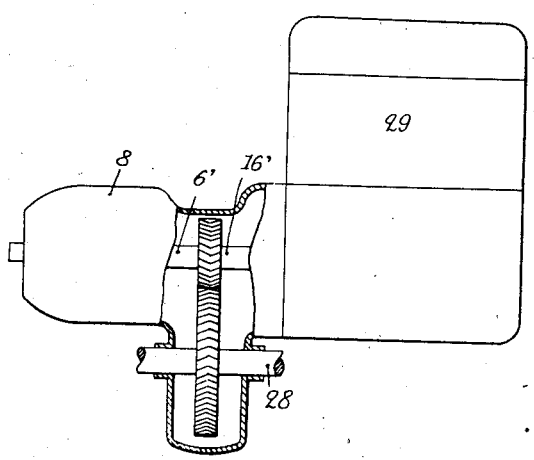
Figs. 3 and 4 are front and side views showing a modification of the box represented in Fig. 2.
Figure 4:
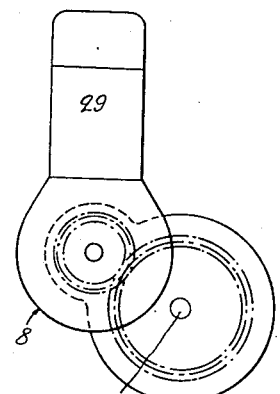

In Figs. 3 and 4, the axis of the gear box, represented by its casing 8, is parallel to the axis of rotation 28 of the actuated parts, the engine being diagrammatically represented at 29.

It will be observed on the other hand that it is feasible to transmit the movement between the axes 16' and 28 which are situated in different planes, even if they make an angle with each other.

Fig. 5 shows a mechanism which comprises the same features as in the first figure, but in which there are only employed two speeds for forward drive, and herein the transfer to forward drive or to reverse drive is obtained by electric means.

The operation is as follows:

*Forward drive at the first speed.*—The rotatable electromagnet 31 secured to the driving shaft 30, and the fixed electromagnet 33 secured to the casing 35, are both energized. The planetary pinion carrier 36 secured to the armature 37 is thus driven at the same speed as the driving shaft 38, and by means of the planetary pinions 38, the orbit gear 39 and hence the orbit gear 40, will also rotate at the same speed as the driving shaft 30. On the other hand, the sun-wheel 41, secured to the armature 42, is held fast, and this affords, for the planetary pinion carrier 43 and hence for the driven shaft 44 (which bears at a point near the front bearing 45 of the gear case) a reduced speed.

*Forward drive at the second speed.*—The rotatable electromagnet 31 secured to the driving shaft 30, is energized, as well as the rotatable electromagnet 34 secured to the driven shaft 44, which is thus operated on direct drive.

*Reverse drive.*—The reverse drive is obtained by energizing the fixed electromagnet 32. The planetary pinion carrier 36 is held fast. The driving shaft 30 acts by its gear wheel 46 upon the planetary pinions 38 of the planetary pinion carrier 36 which is held in the fixed position, and hence these pinions will drive the orbit gear 39 in the reverse direction. This will afford, for this gear, a reverse drive at reduced speed, which can be transmitted, either directly or after another speed reduction, to the driven shaft 44.

Fig. 6 represents a mechanism analogous to the one shown in Fig. 5, but herein the driving shaft 30' and the driven shaft 44' are arranged as shown in Fig. 2 in order to permit the direct driving of a device 28' located between the engine and the gear box.

Fig. 7 represents a mechanism for eight speeds, with reverse motion which provides forward and reverse speeds of the same value.

The apparatus consists of an auxiliary planetary set which is situated to the left of the figure and is used for the reverse drive, and is followed by three planetary sets affording the different speeds.

All of these sets are controlled by electromagnets 51, 52, 53, 54, 55, 56, 57 and 58.

The rotatable electromagnets 51 and 53 are respectively secured to the driving shaft 47 and to the gears 48 and 49. The rotatable electromagnet 56 is secured to the planetary pinion carrier 50. The electromagnet 57 is secured to the planetary pinion carrier 50 and to the large orbit gear 59.

The fixed electromagnets 52, 54, 55 and 58 are secured to the casing 60.

Between these electromagnets are located the armatures 61, 62, 63 and 64, which are respectively secured to the planetary pinion carrier 65, to the large orbit gear 66, to the small sun-wheel 67, and to the small sun-wheel 68.

The supporting disc 69 for the planetary pinions 70 which are engaged between the gears 49 and 66, is secured to the large orbit gear 71.

The supporting disc 50 for the double-stepped planetary pinions 72 engaged between the gears 67 and 71 is secured to the rotatable electromagnets 56 and 57, as above stated.

The supporting disc 73 for the planetary pinions 74 engaged between the gears 59 and 68, is secured to the driven shaft 75.

The orbit gear 48 receives the movement of the driving shaft 47 through the medium of the auxiliary gear set.

The planetary pinion carrier 65 of this set is secured, for rotation, to the armature 61 by means of keys, such as 76 for example, which are located on the centering cylinder between the planetary pinion carrier 65 and the armature 61. These keys leave the armature 61 free to move laterally to the right or left of its middle position shown in Fig. 7, but elastic strips located on either side, such as 77, 77' bring back the said armature to its middle position and hold it therein, when none of the electromagnets 51 and 52 have been energized. This position corresponds to the idle position; in this case, the armature 61 is free to turn loosely, and no movement is imparted by the driving shaft to the gears 48 and 49. Fig. 8 shows the bending of the strips 77' when the electromagnet 52 is energized and attracts the armature 61.

*Operation for the forward speeds.*—For the forward speeds, the electromagnet 51 is energized; it attracts the armature 61 which makes contact with the same, and takes a position which is symmetrical with the one shown in Fig. 8. The whole auxiliary set rotates as a simple device at the speed of the engine, and actuates the gears 48 and 49.

*First speed.*—The fixed electromagnets 54, 55 and 58 are energized. This affords three successive speed ratios, one for each gear set.

*Second speed.*—The fixed electromagnets 54, 55 and the rotatable electromagnet 57 are energized. This affords the two speed reduction ratios for the first two gear sets, and the direct drive for the third gear set.

*Third speed.*—The fixed electromagnets 54, 58 and the rotatable electromagnet 56 are energized. The first and the third gear sets operate by speed reduction, and the second gear set is on direct drive.

*Fourth speed.*—The fixed electromagnet 54 and the rotatable electromagnets 56 and 57 are energized. The first gear set operates by speed reduction, and the second and third are on direct drive.

*Fifth speed.*—The rotatable electromagnet 53 and the fixed electromagnets 55 and 58 are energized. The first gear set is on direct drive, and the second and third operate by speed reduction.

*Sixth speed.*—The rotatable electromagnets 53, 57 and the fixed electromagnet 55 are energized. The first and the third sets are on direct drive, and the second operates by speed reduction.

*Seventh speed.*—The rotatable electromagnets 53, 56 and the stationary electromagnet 58 are energized. The first and the second sets are on first direct drive, and the third set operates by speed reduction.

*Eighth speed.*—The rotatable electromagnets 53, 56, 57 are energized. The three sets are on direct drive. The driven shaft 75 rotates at the same speed as the driving shaft 47.

It will be noted that in order to obtain eight speeds which are suitably graduated, it is necessary, in this device, that the speed reduction afforded by the first gear set shall exceed the speed reduction of the second and third set, and that the speed reduction of the second gear set shall exceed that of the third set.

*Operation for the reverse speeds*

For the reverse speeds, the fixed electromagnet 52 is energized; it attracts the armature 61 which makes contact with the electromagnet 52 and thus has the position shown in Fig. 8.

The planetary pinion carrier 65 is thus held fast, and the double-stepped planetary pinions, in which the teeth 78 are engaged with the sun-wheel 80 secured to the driving shaft 47, and the teeth 79 are engaged with the orbit gears 48, will rotate on their axes, thus driving the orbit gear 48 in the reverse direction at the same speed as the driving shaft 47, as the ratios of the teeth of the wheels 78 with 79, and 80 with 48, are equal.

As the orbit gear 48 actuates the sun-wheel 49, the eight speeds for reverse drive are obtained in the same manner as the eight forward speeds.

Fig. 9 shows a modification adapted for the mechanical control of the reverse drive, which is applicable to all of the gear boxes above described. The figure corresponds to the idle position. A fork 81 operated by a lever 82 can displace the toothed sleeve 83 along the axis of revolution. The said sleeve is slidable in grooves 90 formed in the planetary pinion carrier 84, with which the sleeve is thus connected for rotation.

When it is pushed according to the arrow $f^1$, which corresponds to forward drive, the toothed sleeve 83 engages with the teeth 85 of the double-stepped planetary pinions 85, 86 and thus holds these latter in position, and they cannot rotate on their axes, hence securing the orbit gear 87 to the driving shaft 88, and this wheel is therefore directly driven by the latter.

When it is pushed according to the arrow $f^2$, which corresponds to the reverse drive, the toothed sleeve 83 is released from the teeth 85 and engages the teeth of a fixed disc 89, while still remaining in engagement with the groove 90 of the planetary pinion carrier 84, which latter is thus held against rotation. Subsequently, the reverse drive takes place as above set forth. As in the preceding description, it is also feasible, if desired, to obtain a reversed drive affording the same speeds as in the forward drive, by properly determining the ratios of the teeth 85 to 86 and 91 to 87.

In order to prevent the toothed sleeve 83 from actuating the planetary pinion carrier 84, a disc 92 secured to the sun-wheel 91 is engaged between the two steps 85 and 86 of the planetary pinions which it maintains in the same normal plane, and it thus holds the planetary pinion carrer 84 against lateral motion. Thus the use of the toothed sleeve 83 avoids the planetary pinion carrier 84 being displaced.

It is also feasible to employ a toothed sleeve similar to the one shown in Fig. 7, by connecting this sleeve with the armature 61.

The various mechanisms above described are provided with a pump operated by the driving shaft. It delivers oil to the centre of the shafts and provides for the lubrication as soon as the driving shaft commences to rotate, whether the driven shaft is operated or not. The said pump, which is shown in section in Fig. 10, is represented only in its application to Fig. 1, but it may obviously be used with the other devices above described. This pump, of a known type, chiefly consists of a fixed body 93 having an eccentric chamber 94 in which is movable a plate 95 traversing diametrically the driving shaft 16 and driven by the latter. The said plate closes and opens conduits 96 leading to the interior of the shaft 16, in such a way that the rotation of the shaft 16 and the alternate movement given to the plate 95 by the eccentric chamber permits of expelling, towards the centre, the oil entering the eccentric chamber through a suitable orifice 97.

The said mechanisms are further provided with a device permitting of holding the driven shaft in position, independently of the use of electric energy, in order to prevent, for example (aside from all other braking means) a vehicle from being moved on account of a slope of the ground. As shown in Figs. 1, 2, 5 and 6, in order to place this device in operation from the outside of the casing, a rod 98, which is normally held in the raised position by a pin 99, bearing upon the casing, may be turned in such a way that the said pin 99 will engage in a groove 100 in the casing, and thus the said rod 98, driven by the spring 101, will enter a recess 102 in the electromagnet 4 or 34 secured to the driven shaft 6 or 44, as shown in Figs. 1ª, 2ª, 5ª and 6ª.

Obviously, the invention is not limited to the methods of execution above described, which are susceptible of numerous modifications. Thus, in the different examples, it is possible to modify the manner of combining, the one with the other, two successive planetary sets. By way of example, in the case of Fig. 1, instead of securing the planetary pinion carrier 13 to the orbit gear 14, it is possible to secure the planetary pinion carrier 13 to the sun-wheel 12, the gear 14 then becoming connected with the armature 11. On the other hand, it will be noted that in the mechanism shown in Fig. 2, it is possible to mount the speed reversing device on the driving shaft 16', but on the opposite side from the one in which it is situated in this figure, that is to say, to the right of the right hand end of the driven shaft 6'. In this case, the shaft actuated by the reversing device, is directly secured to the rotatable electromagnet 1 and to the orbit gear 10'.

Having now described my invention what I claim as new and desire to secure by Letters Patent is:

In combination a driving shaft, a driven shaft, two concentrically disposed gears respectively secured to said driving shaft and to said driven shaft, a pinion carrier loosely mounted on one of said shafts, planetary pinions rotatably mounted on said carrier and adapted to mesh with said gears, a fixed electromagnet, a rotatable electromagnet secured to said driving shaft, an armature splined on said pinion carrier and adapted to be selectively attracted by said electromagnets, and flat springs secured to said carrier on either side of said armature and adapted to urge said armature in an intermediate position between said electromagnets and out of contact with said electromagnets.

JEAN COTAL.